(12) United States Patent
Matsumura et al.

(10) Patent No.: US 7,706,104 B2
(45) Date of Patent: Apr. 27, 2010

(54) ROTATING DISK STORAGE DEVICE HAVING A CARRIAGE FORMED WITH NON-BINDING PADS

(75) Inventors: Satoshi Matsumura, Kawasaki (JP); Kazutaka Okasaka, Kanagawa (JP); Hiroshi Matsuda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 384 days.

(21) Appl. No.: 10/940,298

(22) Filed: Sep. 13, 2004

(65) Prior Publication Data

US 2005/0063095 A1    Mar. 24, 2005

(30) Foreign Application Priority Data

Sep. 18, 2003    (JP) ............................. 2003-326776

(51) Int. Cl.
    *G11B 5/48*    (2006.01)
(52) U.S. Cl. .................................. 360/244.5
(58) Field of Classification Search ............. 360/244.5, 360/265.9, 294.6, 246.3, 244.3, 106, 265.7, 360/266.1
See application file for complete search history.

(56) References Cited

U.S. PATENT DOCUMENTS

| | | | | |
|---|---|---|---|---|
| 5,930,083 A | * | 7/1999 | Adley | 360/244.5 |
| 5,956,210 A | * | 9/1999 | Kaneko | 360/244.6 |
| 5,986,852 A | * | 11/1999 | Berg et al. | 360/265.9 |
| 6,487,053 B1 | | 11/2002 | Matsumura et al. | |
| 6,704,170 B2 | * | 3/2004 | Bagaoisan et al. | 360/265.7 |
| 6,728,072 B1 | * | 4/2004 | Van Sloun et al. | 360/244.6 |
| 6,731,466 B2 | * | 5/2004 | Arya | 360/244.3 |
| 6,934,125 B2 | | 8/2005 | Takagi et al. | |

FOREIGN PATENT DOCUMENTS

| | | |
|---|---|---|
| JP | 60-173176 U | 11/1985 |
| JP | 11-203809 | 7/1999 |
| JP | 2000-243044 | 9/2000 |
| JP | 2003-068970 A | 3/2003 |

OTHER PUBLICATIONS

Office action of Mar. 14, 2008, in Japanese application No. 2003-326776.

* cited by examiner

*Primary Examiner*—David D Davis
(74) *Attorney, Agent, or Firm*—Townsend and Townsend and Crew LLP; John Henkhaus (57) ABSTRACT

Embodiments of the invention enhance a mounting precision of a head gimbal assembly with respect to a carriage. In one embodiment, a rotating disk storage device comprises a magnetic disk; head gimbal assemblies each including a slider provided at a front end thereof and a mounting portion provided at a rear end thereof, the slider including a head for reading data from the magnetic disk; and a carriage holding a voice coil. The carriage is formed with a pivot opening into which a pivot cartridge for turning about a pivot shaft is inserted and mounting surfaces on which the mounting portions of the head gimbal assemblies are mounted, and a first pad, a second pad and a third pad projected so as to come into partial face contact with the head gimbal assemblies on the mounting surfaces.

14 Claims, 10 Drawing Sheets

ROTATING DISK STORAGE DEVICE HAVING A CARRIAGE FORMED WITH NON-BINDING PADS

BACKGROUND OF THE INVENTION

The present invention relates to a rotating disk storage device, such as a magnetic disk drive or an optical magnetic disk drive, and particularly to a rotating disk storage device having a construction which enhances the precision of mounting a head gimbal assembly to a carriage.

A magnetic disk drive as a rotating disk storage device has been used as a data recording device for a personal computer. With recent progress of technology, data recording density is increased, and super-miniaturization of a hard disk, that is, a magnetic disk has been promoted.

Such a magnetic disk as described above comprises a magnetic disk provided with a recording surface formed with a magnetic layer on the surface thereof and provided so as to be rotated about a spindle, a head stack assembly, and a control unit for writing and reading data to and from the magnetic disk and controlling the operation of the head stack assembly.

The head stack assembly comprises a head gimbal assembly and a carriage. The head gimbal assembly is provided with a suspension load beam secured to a mount plate for mounting the carriage thereto. The suspension load beam is attached with a slider, which is provided with a magnetic head for reading and writing data and provides an air bearing surface (ABS). The carriage is partly formed with a coil support to hold a voice coil. The coil support is arranged in a magnetic field formed by a voice coil magnet and a voice coil yoke. The voice coil magnet, the voice coil yoke and the voice coil constitute a voice coil motor (VCM) for producing a driving force for turning the carriage.

When the magnetic disk rotates, an airflow on the surface thereof provides an air bearing, which gives buoyancy to the air bearing surface of the slider, thereby slightly raising the slider from the surface of the magnetic disk. By the driving force of the voice coil motor, the slider turns about a pivot shaft approximately in a radial direction of the magnetic disk while slightly floating from the surface of the magnetic disk. Thus, the magnetic head is able to write and read data to and from a specified position of the disk surface.

Further, the magnetic disk drive employs a CSS (Contact Start Stop) system or a load/unload system in order to prevent a phenomenon called a stiction such that a magnetic head sticks to a magnetic disk to make rotation of the magnetic disk impossible, or to cause damage to the magnetic head or magnetic disk. The CSS system has a construction in which a concavo-convex portion is provided on the surface of the magnetic disk only at a specific region thereof, and when rotation of the disk is stopped, the magnetic disk is retracted at the specific region. The load/unload system has a construction in which a ramp is provided for making the disk apart from the magnetic disk when the rotation of the disk is stopped.

Furthermore, there is provided a stopper for limiting a turning range of the head stack assembly. This stopper comes in contact with a crush point of the carriage to limit the turning range.

As such a rotating disk storage device as described, a data recording device by which various difficulties produced when miniaturization is made has been proposed (for example, see Japanese Patent Laid-Open No. 2000-243044.

The magnetic disk drive has been recently further miniaturized, and 2.5 type (2.5 inch or approximately 6.35 cm type) to 1 type (1 inch or approximately 2.54 cm type) have been developed. In the super-miniaturized magnetic disk drive as described, the dimensional tolerance of the component parts thereof is made further smaller, and it is demanded that its processing precision and mounting precision are maintained further strictly as compared with conventional devices. By way of example, in the magnetic disk drive, a magnetic disk and a head stack assembly are mounted as separate components on the base of a casing. In this case, a slider attached to the head gimbal assembly is configured to float at a fixed height from the recording surface of the magnetic disk at the time of operation. Accordingly, the height or altitude of the head gimbal assembly with respect to the height of the recording surface of the magnetic disk has to be set within the range of tolerance strictly in the assembled state. To this end, it is necessary that the magnetic disk be mounted on the base of the housing with high precision and the head gimbal assembly also be mounted on the carriage while maintaining the parallelism between them strictly.

On the other hand, with the miniaturization of the magnetic disk drive, the carriage constituting the head gimbal assembly has been also required to have a further precise shape, and a synthetic resin such as a liquid crystal polymer has been used in place of the conventional aluminum die-cast. This is because it is difficult to manufacture a carriage of precise construction by casting or metal processing. However, in the synthetic resin, it is impossible to carry out secondary processing such as surface finishing by way of polishing or cutting after molding, unlike metal, thus necessitating fabricating a mold with high precision.

To provide the parallelism between the mounting surface of the carriage and the head gimbal assembly, the whole portion of a cavity or the like of the mold corresponding to the mounting surface has to be cut and adjusted. It is however very difficult to cut the whole portion corresponding to the mounting surface. In addition, when the whole portion is cut excessively, the cavity or the like has to be prepared again. Further, even if the parallelism of the mounting surface of the carriage is satisfactorily provided, when the head gimbal assembly is mounted on the carriage and fastened by a pivot cartridge and a nut, a slight warp occurs in the head gimbal assembly. Accordingly, a mold making allowance of the warp in advance has to be fabricated, and a trial and error approach has been required to fabricate a mold in order to provide parallelism in the state of being assembled as the head stack assembly.

BRIEF SUMMARY OF THE INVENTION

Embodiments of the present invention provide a rotating disk storage device provided with a construction capable of enhancing precision of a relative positional relation between a head gimbal assembly and a rotating disk recording medium when a head stack assembly is incorporated into a rotating disk storage device such as a magnetic disk drive.

According to a first aspect of the present invention, there is provided a rotating disk storage device comprising a rotating disk recording medium; a head gimbal assembly including a slider provided at a front end thereof and a mounting portion provided at a rear end thereof, the slider including a head for reading data from the rotating disk recording medium; a carriage for holding a voice coil for moving the slider of the head gimbal assembly above the rotating disk recording medium, the carriage being formed with a pivot opening into which a pivot member is inserted and a mounting surface on which the mounting portion of the head gimbal assembly is mounted; and a plurality of pads formed on the mounting surface of the carriage in such a manner as to project therefrom and come into partial face contact with the head gimbal assembly.

In some embodiments, the plurality of pads may be formed on a circumference of the pivot opening, or the plurality of pads are formed along a ring defined on a circumference of the pivot opening.

In specific embodiments, the plurality of pads may include three pads, which are a first pad, a second pad, and a third pad; the first pad may be disposed on a side of the slider in such a manner as to be passed through by a straight line connecting a turning center of the pivot member and a center of the slider, and the second pad and the third pad may be oppositely spaced at a predetermined interval with the straight line centered therebetween and disposed on a side of the voice coil; a positional relation of the first pad, the second pad and the third pad represents an isosceles triangle in which the first pad provides a vertical angle with reference to the centers of the pads. The vertical angle is about 20 degrees or more and about 50 degrees or less, whereby the adjustment of parallelism in the pitch direction of the head gimbal assembly can be done further minutely; and the vertical angle is about 70 degrees or more and about 90 degrees or less, whereby adjustment of the parallelism in the roll direction of the head gimbal assembly can be done further minutely. It is noted that the plurality of pads may consist of two pads, which are a first pad and a second pad.

In some embodiments, the mounting surfaces are provided on both surfaces of the carriage, the pads are formed face-symmetrically on each of the mounting surfaces, and a first head gimbal assembly and a second head gimbal assembly are mounted on the respective mounting surfaces so as to put the carriage therebetween.

According to a second aspect of the present invention, there is provided a rotating disk storage device comprising a rotating disk recording medium; a head gimbal assembly including a slider provided at a front end thereof and a mounting portion provided at a rear end thereof, the slider including a head for reading data from the rotating disk recording medium; a carriage for holding a voice coil for moving the slider of the head gimbal assembly above the rotating disk recording medium, the carriage being formed with a pivot opening into which a pivot member is inserted and a mounting surface on which the mounting portion of the head gimbal assembly is mounted; and a plurality of pads formed on the mounting surface of the head gimbal assembly in such a manner as to project therefrom and come into partial face contact with the carriage.

According to embodiments of the present invention, a rotating disk storage device has a construction in which when a head stack assembly is incorporated into a rotating disk storage device such as a magnetic disk drive, precision of a relative positional relation between a head gimbal assembly and a rotating disk recording medium can be enhanced. There is provided a rotating disk storage device in which particularly in a case where a carriage is molded by diecast, fabrication of a mold can be done easily; and in a metal carriage, when surface finishing is carried out, a finish-area is reduced, thereby facilitating the processing.

DETAILED DESCRIPTION OF THE INVENTION

Figure 1:
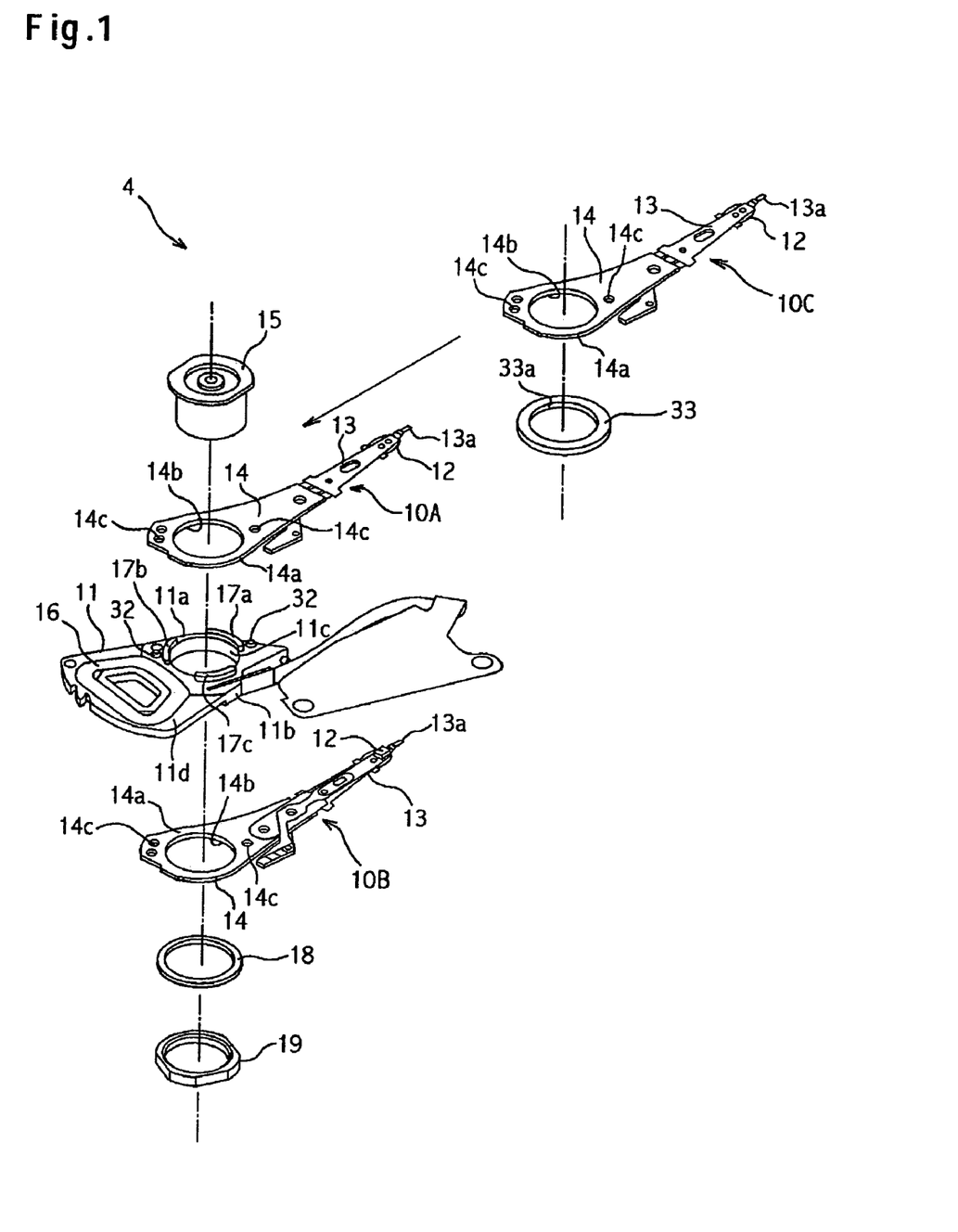
FIG. 1 is an exploded perspective view of one embodiment of a rotating disk storage device according to the present invention, showing a construction of a head stack assembly.
Figure 2:
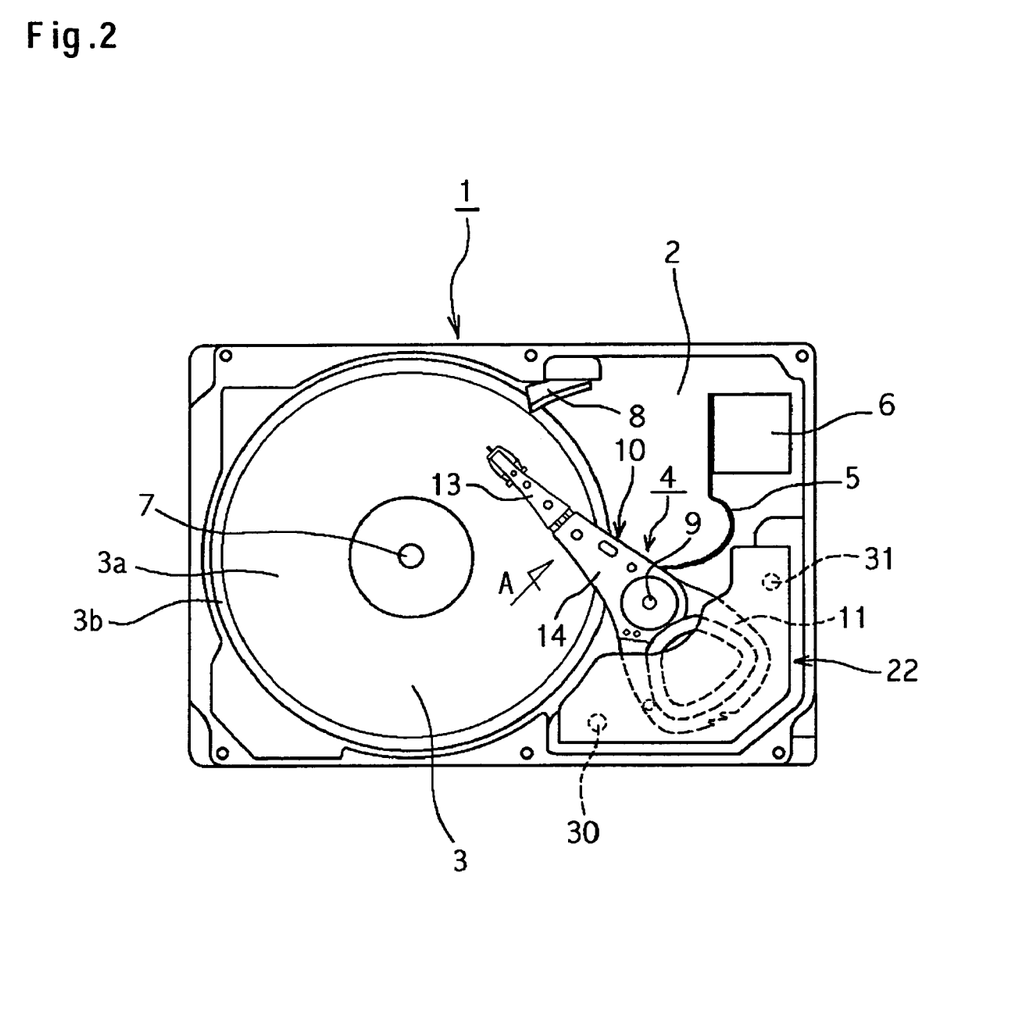
FIG. 2 is a plan view showing a schematic structure of a magnetic disk drive according to one embodiment of a rotating disk storage device according to the present invention.
Figure 3:
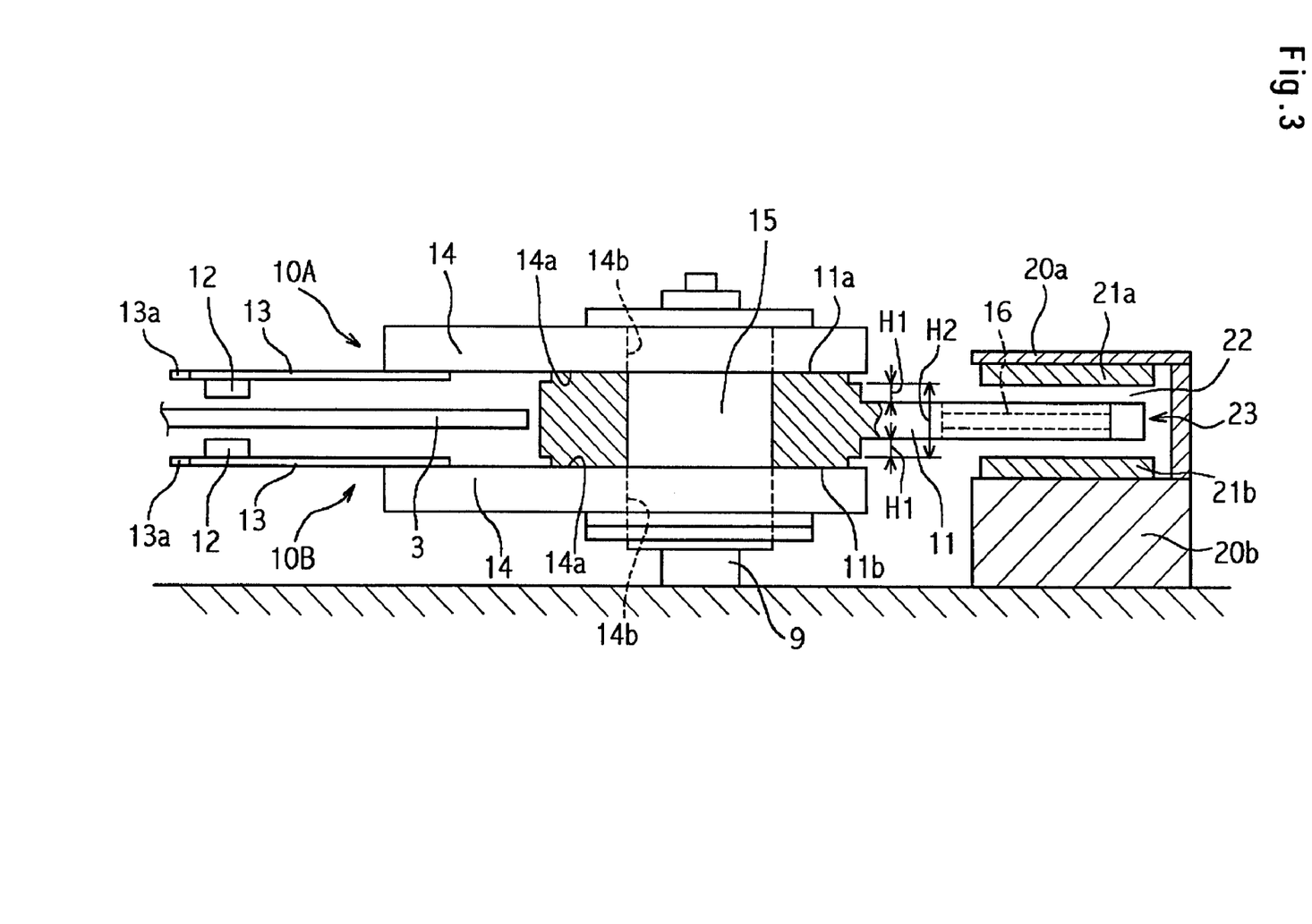
FIG. 3 is a partial sectional view of FIG. 2.

The exemplary embodiment of a rotating disk storage device according to the present invention will be described hereinafter with reference to the drawings. FIG. 1 is a partial detailed view showing a head stack assembly as an essential part of a magnetic disk drive according to one embodiment of the present invention; FIG. 2 is a plan view showing a general constitution of the magnetic disk drive according to the present invention; FIG. 3 is a partial sectional view of the head stack assembly as viewed from an arrow A; and FIGS. 4(a) and 4(b) are plan views of the head stack assembly, as viewed from the surface and the bottom respectively.

For example, a magnetic disk drive which is a rotating disk storage device embodying the present invention includes a magnetic disk 3 which is, for example, a rotating disk recording medium and a head stack assembly 4, which are contained in a closed space of clean atmosphere defined by a housing 2 and a housing lid (not shown) for covering an upper portion of the housing, as shown in FIG. 2. Further, a flexible cable 5 and a control unit 6 connected to the flexible cable 5 are mounted internally of the housing 2.

The magnetic disk 3 comprises a substrate made of aluminum as an material, a variety of layers, formed on the substrate, for improving an adhesiveness or magnetic characteristics and protecting the surface, and a magnetic layer for holding data as a change of a magnetic domain formed by a sputter adhesion process. Further, the magnetic disk 3 is provided with a recording surface 3a which occupies a major central portion for recording data, and an annular non-recording surface 3b which is not utilized for recording data in the vicinity of the circumference of the recording surface on each of the surface and bottom thereof. Such a magnetic disk 3 as described is screwed to a rotor part of a spindle motor (not shown) arranged parallel with the bottom surface of the housing 2 and provided on the housing 2, and is drivingly rotated about a spindle shaft 7 by the spindle motor.

Figure 4:
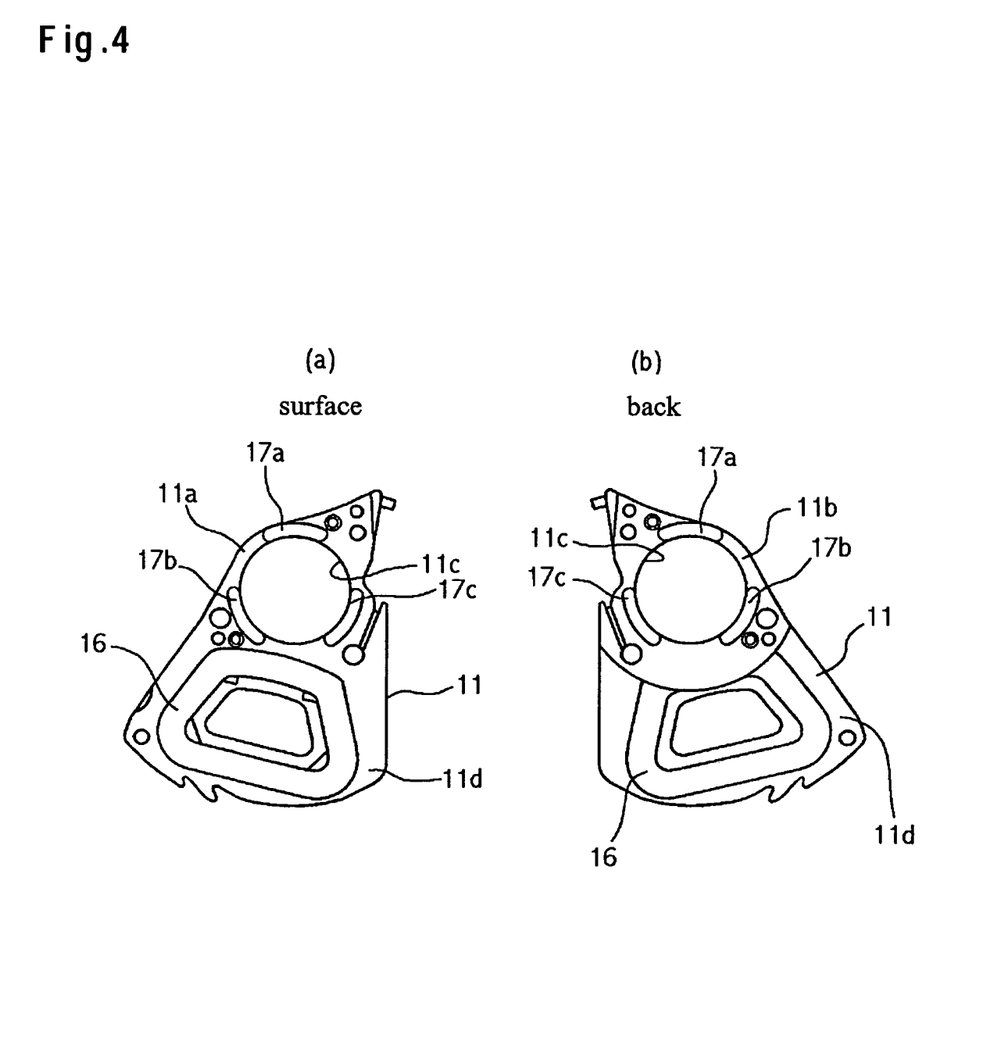
FIG. 4 is a plan view showing the head stack assembly of FIG. 1.

The head stack assembly 4 is composed, for example, of two head gimbal assemblies 10A, 10B and a single carriage 11, as shown in FIGS. 1, 3 and 4. The first head gimbal assembly 10A is mounted on an upper mounting surface 11a of the carriage 11. The second head gimbal assembly 10B is mounted on a lower mounting surface 11b of the carriage 11. The magnetic disk 3 is disposed between the first head gimbal assembly 10A and the second head gimbal assembly 10B.

The head gimbal assemblies 10A and 10B are each composed of a suspension load beam 13 with a slider 12 mounted at an extreme end portion thereof and a mount plate 14 to which the suspension load beam 13 fixedly connected.

A magnetic head (not shown) for reading data from the magnetic disk 3 is mounted at the distal end of the slider 12 mounted at the extreme end portion of the suspension load beam 13. The slider 12 and the magnetic head are provided on each of the suspension load beams 13 in order to correspond to both surfaces of the magnetic disk 3. Such a magnetic head as described is able to convert an electric signal to a magnetic signal, or vice versa, to write and read data to and from the magnetic disk 3. Alternatively, the magnetic head may be constituted as a magnetic read head in which a recorded magnetic signal is read and converted into an electric signal to thereby reproduce information without writing data to a data region 3a of the magnetic disk 3. Further, the slider 12 is designed so that an air bearing surface (ABS) is formed on the bottom surface, airflow generated on the surface of the rotating magnetic disk 3 impinges upon the air bearing surface of the slider 12 to give buoyancy thereto, and the slider 12 flies while maintaining a slight gap from the surface of the magnetic disk so as to be positioned at a specified position. The positional relation between the recording surface of the magnetic disk 3 and the head gimbal assemblies 10A, 10B having the slider 12 mounted thereon need be controlled strictly. Since the head gimbal assemblies 10A, 10B are supported as the constituent components independently of the base of the housing 2, they are fabricated and assembled in the range of tolerance. Further, the suspension load beam 13 is projectingly provided with a tab 13a at its distal end. The tab 13a is supported on a ramp 8 (see FIG. 2), which is attached to a portion of the housing 2 in the vicinity externally of the magnetic disk 3. This ramp 8 is a constituent element employed in a load/unload system, which is one of technical processes for providing a retracting place for the slider 12 when the rotation of the magnetic disk is stopped. This is disclosed, for example, in Japanese Patent Laid-open No. 10-302421.

The mount plate 14 is provided at its rear end portion with a mounting portion 14a. The mounting portion 14a is formed with a pivot opening 14b into which is inserted a pivot cartridge 15 which is a pivot member for turning it about a pivot shaft 9 (see FIG. 2).

The carriage 11 is formed at a front portion thereof with a pivot opening 11c for inserting the pivot cartridge 15 and at a rear portion thereof with a coil support 11d for holding the voice coil 16. Further, an upper yoke 20a and a lower yoke 20b define a space therebetween in which the voice coil 16 is disposed. The upper yoke 20a and the lower yoke 20b are respectively provided with voice coil magnets 21a, 21b inwardly, which are formed of permanent magnets, thereby forming a magnetic field space 22 therebetween (see FIG. 3).

The coil support 11d, voice coil 16, voice coil magnets 21a, 21b, upper yoke 20a, and lower yoke 20b constitute a voice coil motor. It is noted that providing one permanent magnet for either yoke inwardly can constitute the voice coil motor.

Further, the lower yoke 20b is provided so as to bond to the housing 2, and a support column (not shown) for supporting the upper yoke 20a is provided on the end of the lower yoke 20b.

A current for turning the head stack assembly 4 flows into the voice coil 16 held on the coil support 20. The magnitude and direction of the current flowing into the voice coil 16 are controlled by the control unit 6 (see FIG. 2) to thereby drive the head stack assembly 4, which positions the slider 12 at a specified position.

Such a magnetic disk drive 1 causes the head stack assembly 4 to move outside the magnetic disk 3 before the rotation of the magnetic disk is stopped, and causes the slider 12 to be retracted to a ramp position while slidably moving the tab 13a on the ramp 8.

When the head stack assembly 4 is turned to a specified position and arrives at a retracting position of the ramp 8, two sliders 12, 12 are held so as to maintain a fixed spacing. Thus, even if the impactive force that vertically accelerates the two sliders 12, 12 is applied to the magnetic disk drive 1, the sliders do not come in contact with each other.

To restrict the excessive movement of the head stack assembly 4 toward the inner or outer side, an outer crash stopper 30 and an inner crash stopper 31 formed of rubber for restricting the turning range of the carriage 11 are provided in the housing 2.

Figure 5:
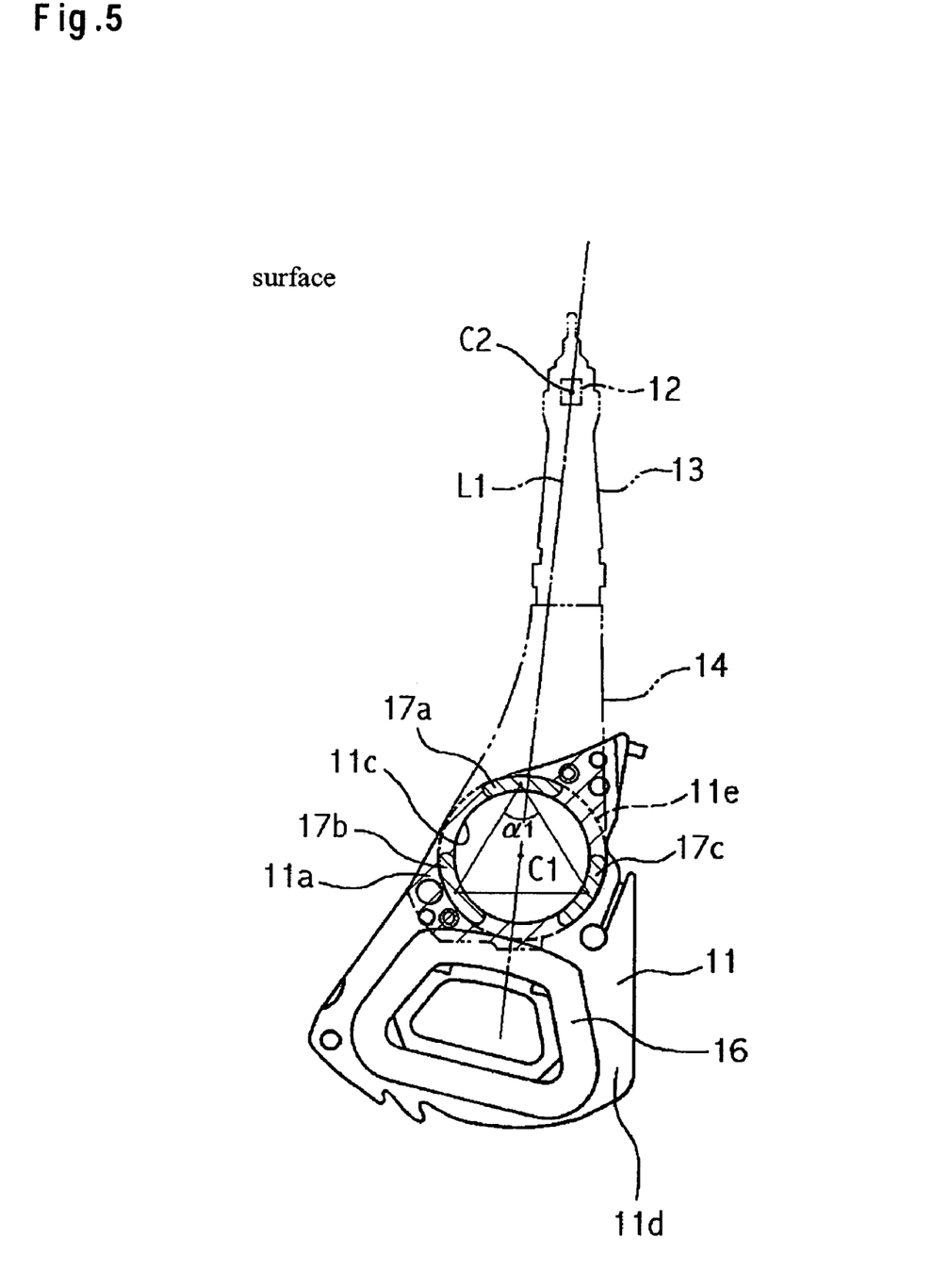
FIG. 5 is an explanatory view showing a relationship between a carriage of the head stack assembly and a head gimbal assembly.

In order to maintain the respective gaps between the head gimbal assemblies 10A, 10B and the magnetic disk 3 constituted as described above within a predetermined range, the precision of mounting the head gimbal assemblies 10A, 10B onto the carriage 11 is enhanced. To that end, as shown in FIGS. 4 and 5, on the mounting surfaces 11a, 11b provided on both surfaces of the carriage 11, a plurality of pads 17 projected so as to partly come into face-contact with the mounting portions 14a of the mount plate 14 of the head gimbal assemblies 10A, 10B are formed face-symmetrically along the ring 11e defined on the circumference of the pivot opening 11b. Thus, to enhance the precision of mounting the head stack assembly 4 to the carriage 11, it is necessary only to adjust the heights of the plurality of pads 17 without adjusting the whole mounting surfaces of both the surfaces of the carriage 11. Accordingly, this makes it easier to adjust the parallelisms between the head gimbal assemblies 10A, 10B and the associated mounting surfaces of the carriage 11.

The plurality of pads 17 are constituted by three pads, for example, comprising a first pad 17a, a second pad 17b and a third pad 17c. The specific constitution of the three pads will be described below with the surface of the carriage 11 as shown in FIG. 5. The first pad 17a of the carriage 11 is arranged on the side of the slider in such a manner as to be passed through by a straight line L1 connecting a turning center C1 of a pivot cartridge 15 to be inserted into a pivot opening 14b of the mount plate 14 and a center C2 of the slider 12 of the suspension load beam 13. In addition, the second pad 17b and the third pad 17c are oppositely spaced with the straight line L1 centered therebetween and disposed on the side of the voice coil. Thus, the heights of the first pad 17a, the second pad 17b and the third pad 17c may be appropriately adjusted to thereby adjust the parallelisms. This accommodates both the adjustments of the parallelisms in the pitch and roll directions of the head gimbal assemblies 10A, 10B. Further, a positional relation between the first pad, the second pad and the third pad may provide an isosceles triangle in which the first pad 17a is a vertical angle $\alpha 1$ with the centers of the pads as a reference. This makes it possible to adjust either the parallelism in a pitch direction or that in a roll direction of the head gimbal assemblies 10A, 10B more finely. Specifically, if the vertical angle $\alpha 1$ is made to be more than about 20 degrees but less than about 50 degrees, the adjustment of the parallelism in a pitch direction of the head gimbal assemblies 10A, 10B can be made more finely; and if the vertical angle $\alpha 1$ is made to be more than about 70 degrees but less than about 90 degrees, the adjustment of the parallelism in a roll direction of the head gimbal assemblies 10A, 10B can be made more finely.

Further, in the carriage 11 formed with the first pad 17a, the second pad 17b and the third pad 17c, the total area of these pads (right-downward hatched regions) accounts for about 40% to 60% of the whole area of the mounting surfaces (a left-downward hatched region) including the areas of the pads. The total area of the pads is divided into the three equal areas. For example, suppose that the whole area of the mounting surfaces including the area of the pads is approximately 7.2 square millimeters, it is preferred that with the area of one pad being approximately 1.2 square millimeters, the total of three pads is 3.6 square millimeters. As long as the area of the pad is more than the minimum area capable of preventing the pad from buckling, a difference in areas of pads may be allowable. Further, a projecting height H1 of the pad may be set at about 10% to 50% of a thickness H2 of the carriage 11, preferably about 10% to 40%, more preferably, about 10% to 30%. Such setting is done because setting the projecting height H1 of the pad to 10% or more of the thickness H2 of the carriage 11 causes the carriage to come into partial face-contact with the head gimbal assembly positively. In addition, setting it to less than about 50%, preferably less than about 40%, more preferably less than about 30%, makes the pad less liable to be buckled.

The constitution of three pads comprising the first pad 17a, the second pad 17b and the third pad 17c as described above is also true of the back-side mounting surface 11b of the carriage 11.

The first pad 17a, the second pad 17b and the third pad 17c capable of facilitating the adjustment of parallelism of the head gimbal assemblies 10A, 10B may be positioned at respective predetermined positions. In this case, the mounting portions 14a, 14b of the head gimbal assemblies 10A, 10B are positioned in the mounting surfaces 11a, 11b of the carriage 11 by use of reference members 32, as shown in FIG. 1. More specifically, the reference members 32 projecting from the mounting surfaces 11a, 11b of the carriage 11 are inserted into corresponding holes 14c bored in the mounting portions 14a, 14a of the head gimbal assemblies 10A, 10B, thereby positioning the pads. Since, as descried above, the reference members 32 can accurately position the head gimbal assemblies 10A, 10B with respect to the carriage 11, they can be used as a reference when the adjustment of parallelism of the head gimbal assemblies 10A, 10B is carried out.

Figure 6:
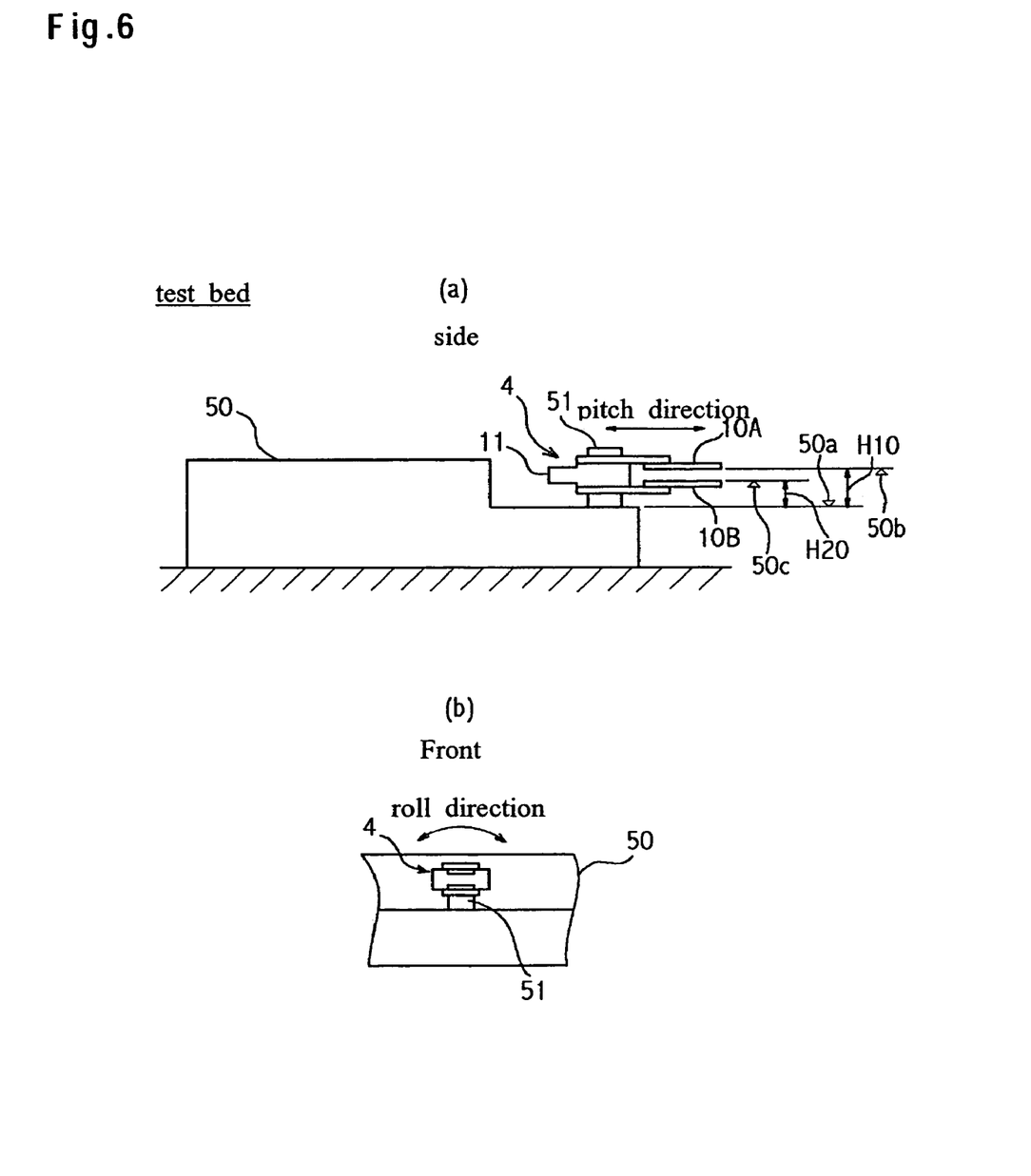
FIG. 6 is an explanatory view showing a test bed for testing a mounting precision of the head gimbal assembly with respect to the carriage of the head stack assembly, (a) being a side view, (b) being a front view.

Such adjustment of parallelism between the head gimbal assemblies 10A, 10B as described above is carried out by incorporating the head stack assembly 4 on a test bed 50 for adjusting the parallelism as shown in FIG. 6(a). On the test bed 50 is provided a shaft 51 that is level-adjusted and inserted into the pivot opening 14b formed in the mount plates 14 of the head gimbal assemblies 10A, 10B and the pivot opening 11c formed in the carriage 11 in such a manner that the axial direction of the shaft extends vertically. The shaft 15 has the same diameter as that of the pivot cartridge 15. After the head stack assembly 4 has been secured to the shaft 51, dimensions H10, H20 between a reference surface 50a of the test bed 50 and a plurality of measuring points 50b, 50c are measured to confirm parallelisms in the pitch and roll directions of the head gimbal assemblies 10A, 10B. The measuring points 50b, 50c are needed to confirm the parallelism of the head gimbal assemblies 10A, 10B of the head stack assembly 4.

In a case where the adjustment of parallelism of the head gimbal assemblies after the confirmation is necessary, if, for example, the carriage 11 is formed of a plastic resin such as a liquid crystal polymer, portions corresponding to the first pad 17a, the second pad 17b and the third pad 17c such as cavities of a plastic molding mold for molding the carriage 11 are merely suitably cut according to the measurements, thus completing the adjustment of parallelism with ease. Further, in a case where the carriage 11 is formed of metal, the first pad 17a, the second pad 17b and the third pad 17c of the carriage 11 are merely suitably cut according to the measurements, thus completing the adjustment of parallelism with ease.

In assembling such a magnetic disk drive 1 as described, the head stack assembly 4 is assembled in advance. The first head gimbal assembly 10A, the carriage 11 and the second head gimbal assembly 10B of the head stack assembly 4 are fixed by the pivot cartridge 15, a spring washer 18 and a nut 29. At this time, in the head gimbal assemblies 10A, 10B, the mounting portions 14a are positioned to the mounting surfaces 11a, 11b of the carriage 11 by the reference members 32 for locating the first pad 17a, the second pad 17b and the third pad 17c at the respective predetermined positions.

In assembling the magnetic disk drive 1, a spindle motor is incorporated into the housing 2 integrally formed with the spindle shaft 7 or the like, and the magnetic disk 3 is screwed to a rotor portion of the spindle motor. The lower yoke 21b with the voice coil magnet 20b attached thereto is provided so as to be bonded to the housing 2.

Then, the head stack assembly 4 is fitted in the pivot shaft 5 by the pivot cartridge 15, the carriage 11 is moved about the pivot shaft 9, and the magnetic head attached to the slider 12 is moved to the magnetic disk 3. The magnetic head side end of a FPC cable not shown is received on the side of the head stack assembly 4. A head wire from the magnetic head and a coil wire from the voice coil 16 of the carriage 11 are connected to the magnetic head side end of the FPC cable. The end opposite to the magnetic head side end of the FPC cable is connector-connected to the control unit 6 by a flexible cable 5.

Finally, the upper yoke 20a with the voice coil magnet 21a attached thereto is placed at the predetermined position of the lower yoke 20b and screwed to the lower yoke 20b.

As described above, after the magnetic disk 3 and the head stack assembly 4 have been assembled, the outer crash stopper 30 and the inner crash stopper 31 are installed, and the housing lid of the housing 2 is mounted, thus completing the assembly.

The operation of the magnetic disk drive 1 as described above will be explained hereinafter. In an inoperative state, the tab 13a of the suspension assembly 13 is positioned at the retracting position of the ramp 8. Here, when the magnetic disk drive 1 is started, the spindle motor is driven to rotate the magnetic disk 3; and therefore, when the voice coil 16 is driven to rotate the head stack assembly 4 in a direction of the magnetic disk, the tab 13a is moved away from the ramp 8 while sliding along the sliding surface of the ramp 8. The slider 12 moves above the surface of the magnetic disk, and flies making use of an air bearing formed with the result that an air current generated by rotation of the magnetic disk flows between the magnetic disk 3 and the slider 12. On the other hand, the operation is stopped by driving the voice coil motor to rotate the head stack assembly 4 in a direction of the ramp, turning it to the retracting position of the ramp 8.

Figure 7:
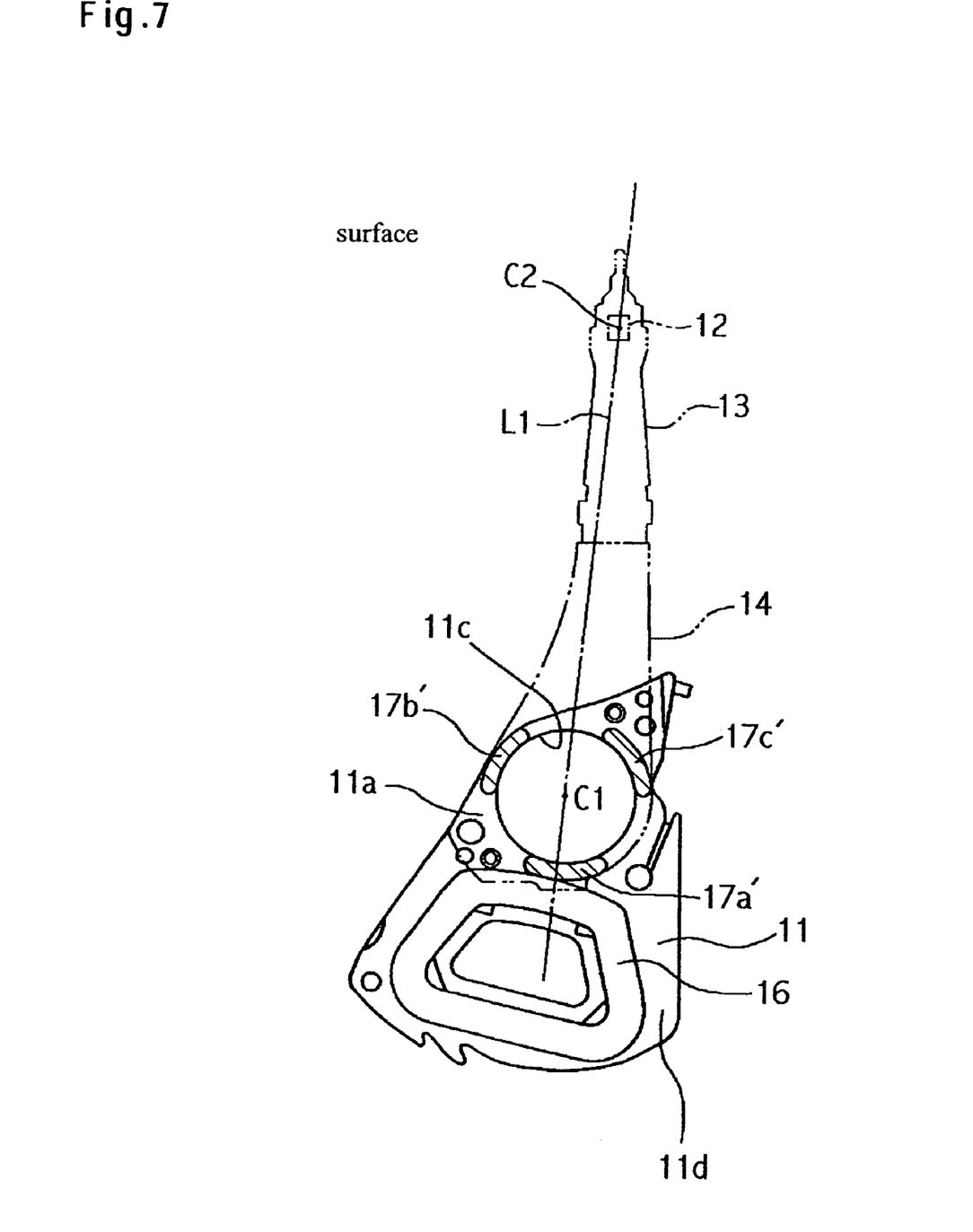
FIG. 7 is an explanatory view showing a relationship between the head stack assembly and the head gimbal assembly.

In the magnetic disk drive 1 according to the exemplary embodiment of the present invention described above, the plurality of pads of the carriage are configured such that the first pad 17a is disposed on a side of the slider so that a straight line L1 connecting the turning center C1 of the pivot member 15 and the center C2 of the slider 12 passes through the first pad 17a, and the second pad 17b and the third pad 17c are oppositely spaced with the straight line C1 centered therebetween and disposed on a side of the voice coil. Alternatively, another arrangement may however be employed in which a first pad 17a' is disposed on a side of the voice coil so that the straight line L1 connecting the turning center C1 of the pivot member 15 and the center C2 of the slider 12 passes through the first pad 17', and a second pad 17b' and a third pad 17c' are oppositely spaced each at a predetermined interval with the straight line L1 centered therebetween and disposed on a side of the slider, as shown in FIG. 7. Even if such an arrangement of the pads as described is employed, the height of the first pad, the second pad or the third pad can be suitably adjusted to adjust the parallelism, which accommodates both the parallelisms in a pitch and roll directions of the head gimbal assembly.

Figure 8:
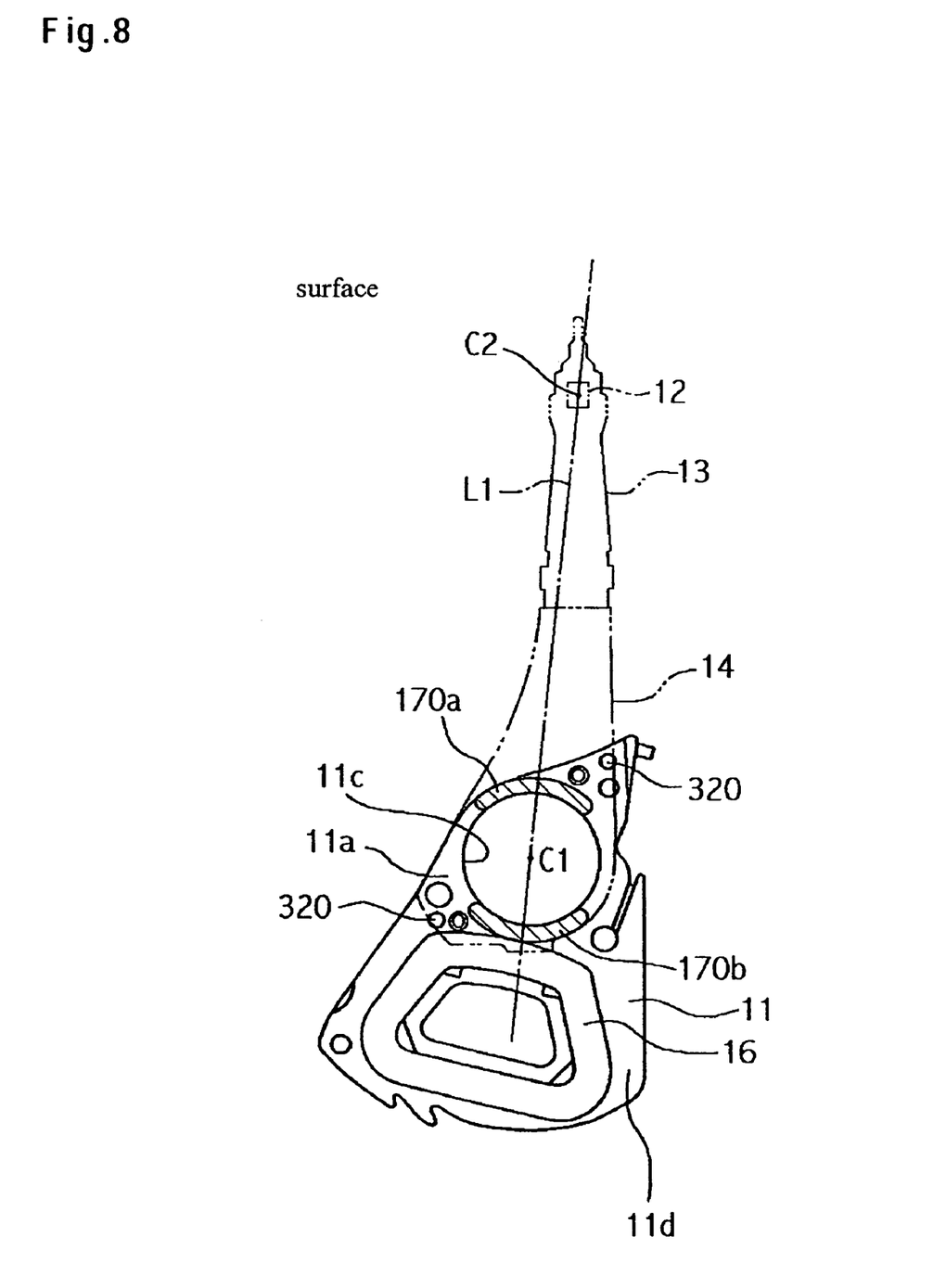
FIG. 8 is an explanatory view showing a relationship between the carriage of the head stack assembly and the head gimbal assembly.
Figure 9:
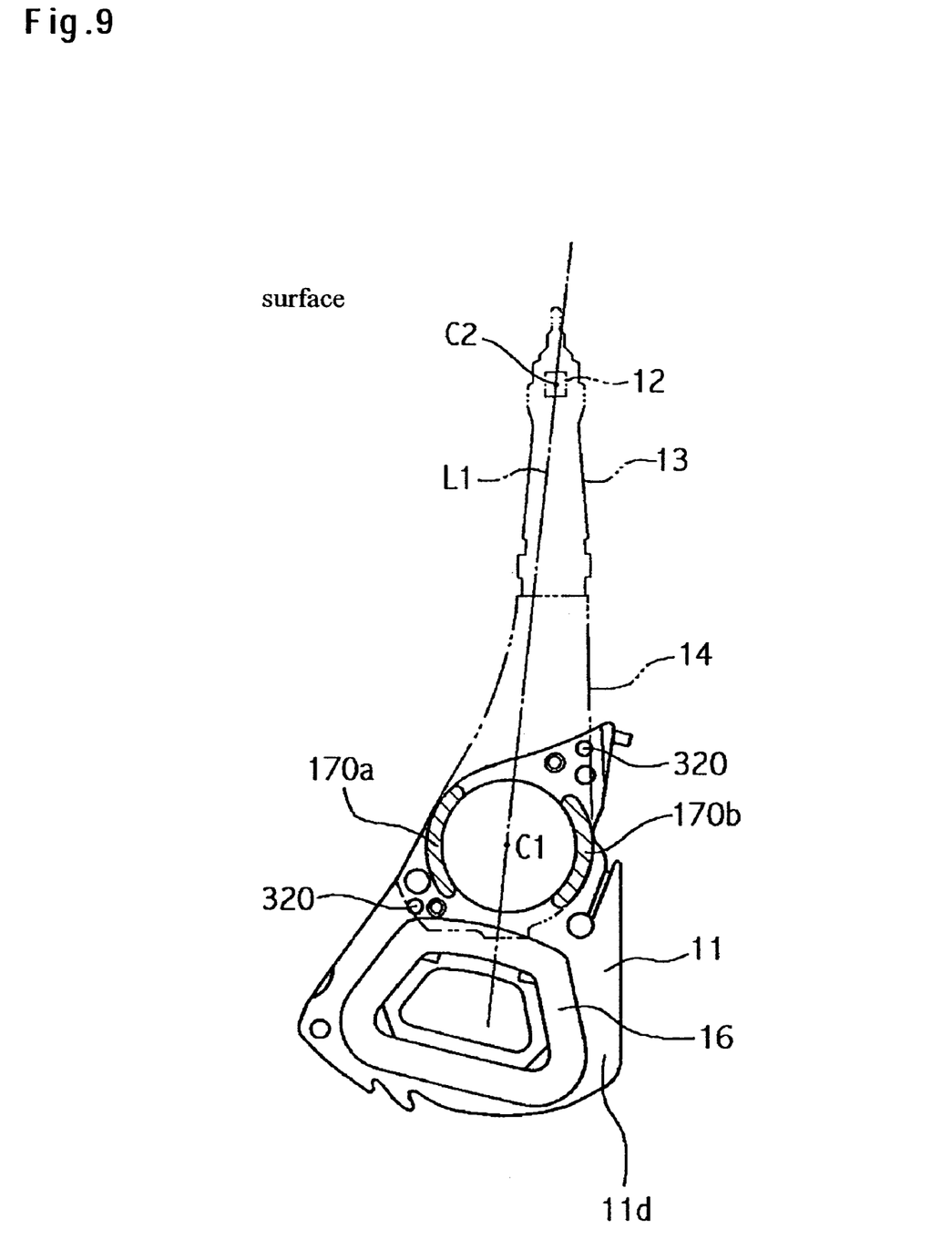
FIG. 9 is an explanatory view showing a relationship between the carriage of the head stack assembly and the head gimbal assembly.

Further, while the plurality of pads of the carriage comprise three pads in this embodiment, the pads may alternatively be constituted by two pads, a first pad 170a and a second pad 170b, as shown in FIGS. 8 and 9. With these arrangements, either the first pad 170a or the second pad 170b may be merely adjusted, thereby achieving the adjustment of parallelism.

Further, the first pad 170a and the second pad 170b are arranged so that a straight line L1 connecting the turning center C1 of the pivot member 15 inserted into the pivot opening 14b of the mount plate 14 of the head gimbal assemblies 10A, 10B and the center C2 of the slider 12 of the suspension load beam 13 passes therethrough, whereby the heights of the first pad 170a and the second pad 170b can be suitably adjusted in the pitch direction of the head gimbal assemblies 10A, 10B, thus facilitating the adjustment of parallelism in the pitch direction of the head gimbal assemblies 10A, 10B (FIG. 8). Further, the first pad 170a and the second pad 170b are oppositely spaced at a predetermined interval with the straight line L1 connecting the turning center C1 of the pivot cartridge 15 and the center C2 of the slider 12 centered therebetween, whereby the heights of the first pad 170a and the second pad 170b can be suitably adjusted in the roll direction of the head gimbal assemblies 10A, 10B, thus facilitating the adjustment of parallelism in the roll direction of the head gimbal assemblies 10A, 10B (FIG. 9).

Further, in the carriage 11 formed with the first pad 170a and the second pad 170b, the total area of these pads accounts for about 40% to 60% of the whole area of the mounting surfaces including the area of the pads. In addition, the total area of the pads is divided into equal areas. However, if the area of a pad is more than the minimum area capable of preventing the pad from buckling, a difference in areas of the pads is allowable. Further, a projecting height H1 of the pad may be set at about 10% to 50% of a thickness dimension H2 of the carriage 11, preferably about 10% to 40%, more preferably, about 10% to 30%. Such a setting is done because setting the projecting height of the pad to about 10% or more of the thickness of the carriage 11 causes the carriage to come into partial face-contact with the head gimbal assembly positively. In addition, setting it to less than about 50%, preferably less than about 40%, more preferably less than about 30%, causes the buckle less liable to be buckled.

To position the first pad 170a and the second pad 170b that facilitate the adjustment of parallelism of the head gimbal assemblies 10A, 10B at the predetermined position, the mounting portions 14a of the head gimbal assemblies 10A, 10B are positioned to the mounting surfaces 11a, 11b of the carriage 11 by the reference members 320. Since the reference member 320 is able to accurately position the head gimbal assemblies 10A, 10B to the carriage 11, it can be used as a reference when the adjustment of parallelism of the head gimbal assemblies 10A, 10B is carried out.

Further, the plurality of pads of the carriage may not necessarily be formed in the circumference of the pivot opening 11c or along the ring 11e defined in the circumference thereof.

Further, while in the magnetic disk drive 1 according to the exemplary embodiment of the present invention, the head stack assembly is configured such that the two head gimbal assemblies are mounted on the single carriage. Alternatively, one head gimbal assembly may merely be mounted on either one of the mounting surfaces of the carriage. In addition, as shown in FIG. 1, another head gimbal assembly 10C may be stacked on the head gimbal assembly 10A mounted on the carriage 11 by way of a spacer 33. Thus, the plurality of head gimbal assemblies and the spacer can be alternately stacked on the mounting surface of the carriage. This arrangement is therefore applicable to the magnetic disk drive with the plurality of magnetic disks stacked therein. However, a magnetic disk drive that maximizes the effect of the present embodiment is the magnetic disk drive 1 provided with the single magnetic disk 3 described above in which the head gimbal assemblies 10A, 10B are mounted on the mounting surfaces 11a, 11b provided on both surfaces of the carriage 11.

If the spacer 33 is formed of ceramics or metal, it can be subjected to surface process finishing, and therefore, the pad(s) formed on the carriage 11 may not always be necessary. If the spacer 33 is formed of a plastic resin, in order to facilitate the adjustment of parallelism of the head gimbal assembly 10C by a plastic molding mold, a plurality of pads may be provide on the circumference of the pivot opening 33a into which the pivot cartridge 15 of the spacer 33 is inserted. This facilitates the adjustment of parallelism since the head gimbal assembly 10C does not come into face-contact with the whole portion of the spacer 33 but the plurality of pads. To position the plurality of pads that facilitate the adjustment of parallelism of the head gimbal assembly 10C at the predetermined position, the mounting portion of the head gimbal assembly 10C is positioned in the upper mounting surface 11a of the carriage 11 by use of the reference member 32. Thus, since the plurality of pads of the spacer 33 can be disposed at the predetermined position by the reference member, it can be used as a reference when the adjustment of parallelism of the head gimbal assembly 10C is carried out.

Figure 10:
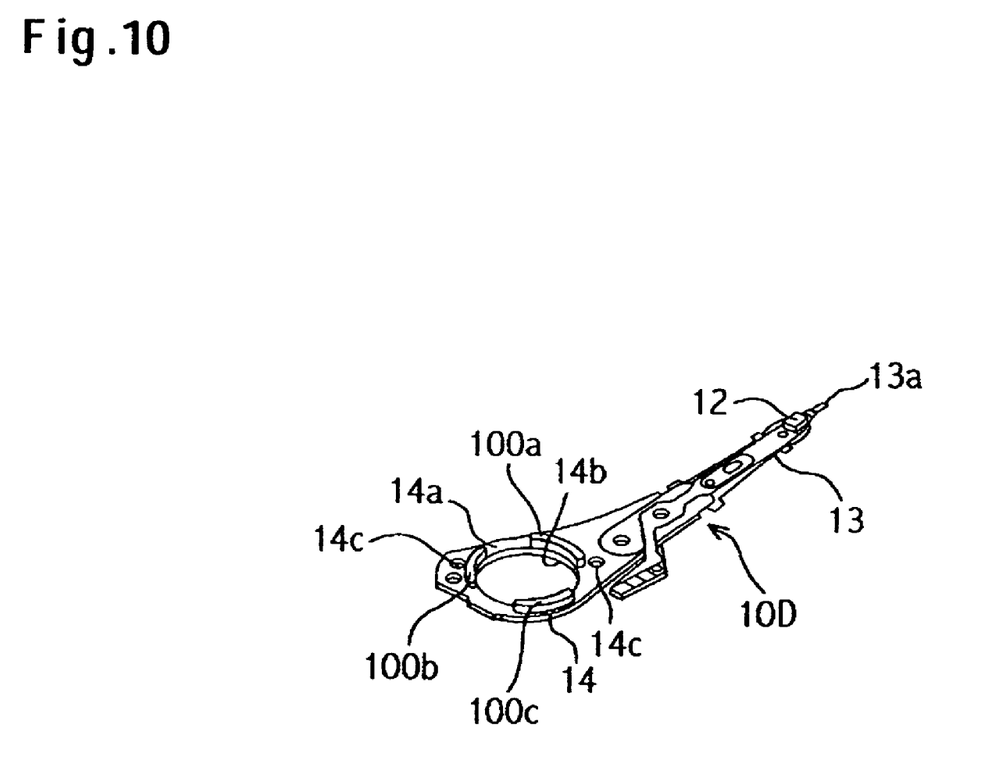
FIG. 10 is a perspective view of another embodiment of a rotating disk storage device according to the present invention, showing a construction of a head gimbal assembly.

Further, in the above-described embodiments, the plurality of pads that are projected and partially come into face contact with the head gimbal assembly are formed on the carriage. Alternatively, as shown in FIG. 10, they may be formed on the circumference of the pivot opening 14b formed in the mounting portion 14a of the mount plate 14 of the head gimbal assembly 10D instead of the carriage, which provides the effect similar to that provided by the pads of the carriage. For example, three pads, that is, a first pad 100a, a second pad 100b and a third pad 100c are configured in such a manner as to projectingly come into partial face contact with the mounting surface of the carriage 11.

Further, the first pad 100a of the head gimbal assembly 10D is disposed on a side of the slider so that a straight line connecting the turning center of the pivot cartridge 15 inserted into the pivot opening 14b and the center of the slider 12 of the suspension load beam 13 passes therethrough, and the second pad 100b and the third pad 100c are oppositely spaced with the straight line centered therebetween and disposed on a side of the voice coil. It is noted that the number of pads, an arranging position, an area and a projecting height in this case are the same as those of the carriage 11 described above.

Furthermore, in the above-described embodiments, the description has been made of the magnetic disk drive of a load/unload type. The description may be applicable to a magnetic disk drive of a CSS (Contact Start Stop) type in which a magnetic disk is provided with a retracting region, and a head stack assembly causes a slider with a magnetic head attached thereto to be retracted to the retracting region by way of a head gimbal assembly.

While the present invention has been described by way of the specific embodiments, it is needless to say that the present invention is not limited to the embodiments shown in the drawings, but any constitution so far known as long as the effect of the present invention is obtained can be employed.

What is claimed is:

1. A rotating disk storage device comprising:
   a rotating disk recording medium;
   a head gimbal assembly including a slider provided at a front end thereof and a mounting portion provided at a rear end thereof, said slider including a head for reading data from said rotating disk recording medium;
   a carriage for holding a voice coil for moving said slider of said head gimbal assembly above said rotating disk recording medium, said carriage being formed with a pivot opening into which a pivot member is inserted and a mounting surface on which said mounting portion of said head gimbal assembly is mounted; and
   first, second, and third pads formed on a circumference of said pivot opening of said carriage in such a manner as to project therefrom and come into detachable and non binding face contact with said mounting portion including a bottom surface of said head gimbal when said head gimbal assembly is mounted on said carriage
   wherein said first pad is disposed on a side of said voice coil in such a manner as to be passed through by a straight line connecting a turning center of said pivot member and a center of said slider, and said second pad and said third pad are oppositely spaced at a predetermined interval with said straight line centered therebetween on a side of said slider
   wherein a positional relation of said first pad, said second pad and said third pad represents an isosceles triangle in which said first pad provides a vertical angle with reference to the centers of said pads, and
   wherein said vertical angle is about 20 degrees or more and about 50 degrees or less.

2. A rotating disk storage device comprising:
   a rotating disk recording medium;
   a head gimbal assembly including a slider provided at a front end thereof and a mounting portion provided at a rear end thereof, said slider including a head for reading data from said rotating disk recording medium;
   a carriage for holding a voice coil for moving said slider of said head gimbal assembly above said rotating disk recording medium, said carriage being formed with a pivot opening into which a pivot member is inserted and a mounting surface on which said mounting portion of said head gimbal assembly is mounted; and
   first, second, and third pads formed on a circumference of said pivot opening of said carriage in such a manner as to project therefrom and come into detachable and non binding face contact with said mounting portion including a bottom surface of said head gimbal when said head gimbal assembly is mounted on said carriage
   wherein said first pad is disposed on a side of said voice coil in such a manner as to be passed through by a straight line connecting a turning center of said pivot member and a center of said slider, and said second pad and said third pad are oppositely spaced at a predetermined interval with said straight line centered therebetween on a side of said slider
   wherein a positional relation of said first pad, said second pad and said third pad represents an isosceles triangle in which said first pad provides a vertical angle with reference to the centers of said pads, and
   wherein said vertical angle is about 70 degrees or more and about 90 degrees or less.

3. The rotating disk storage device according to claim 1, wherein said mounting surfaces are provided on both surfaces of said carriage, said pads are formed face-symmetrically on each of said mounting surfaces, and a first said head gimbal assembly and a second said head gimbal assembly are mounted on respective said mounting surfaces so as to put said carriage therebetween.

4. The rotating disk storage device according to claim 1, wherein said carriage is configured such that a total area of said plurality of pads accounts for about 40% to 60% of a total area of said mounting surfaces including the total area of said pads and the total area of said plurality of pads is divided into equal areas.

5. The rotating disk storage device according to claim 1, wherein a projecting height of each of said pads is about 10% to 50% of a thickness of said carriage.

6. The rotating disk storage device according to claim 1, wherein said mounting portion of said head gimbal assembly is positioned onto said mounting surface of said carriage by a reference member for positioning said pads at respective predetermined positions.

7. The rotating disk storage device according to claim 1, wherein said carriage is formed of a plastic resin.

8. The rotating disk storage device according to claim 1, wherein another head gimbal assembly is stacked on said head gimbal assembly mounted on said carriage by way of at least one spacer therebetween.

9. The rotating disk storage device according to claim 2, wherein said mounting surfaces are provided on both surfaces of said carriage, said pads are formed face-symmetrically on each of said mounting surfaces, and a first said head gimbal assembly and a second said head gimbal assembly are mounted on respective said mounting surfaces so as to put said carriage therebetween.

10. The rotating disk storage device according to claim 2, wherein said carriage is configured such that a total area of said plurality of pads accounts for about 40% to 60% of a total area of said mounting surfaces including the total area of said pads and the total area of said plurality of pads is divided into equal areas.

11. The rotating disk storage device according to claim 2, wherein a projecting height of each of said pads is about 10% to 50% of a thickness of said carriage.

12. The rotating disk storage device according to claim 2, wherein said mounting portion of said head gimbal assembly is positioned onto said mounting surface of said carriage by a reference member for positioning said pads at respective predetermined positions.

13. The rotating disk storage device according to claim 2, wherein said carriage is formed of a plastic resin.

14. The rotating disk storage device according to claim 2, wherein another head gimbal assembly is stacked on said head gimbal assembly mounted on said carriage by way of at least one spacer therebetween.

* * * * *